No. 641,278. Patented Jan. 16, 1900.
J. DICK.
LIFE SAVING NET.
(Application filed May 11, 1899.)
(Model.)
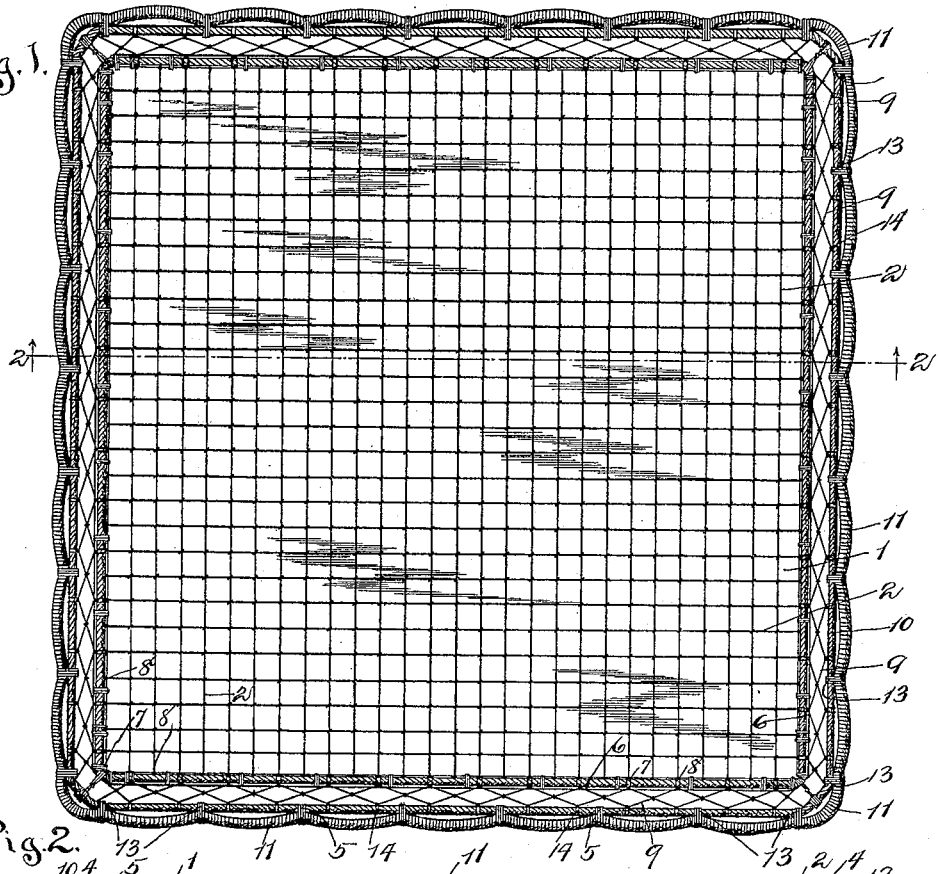
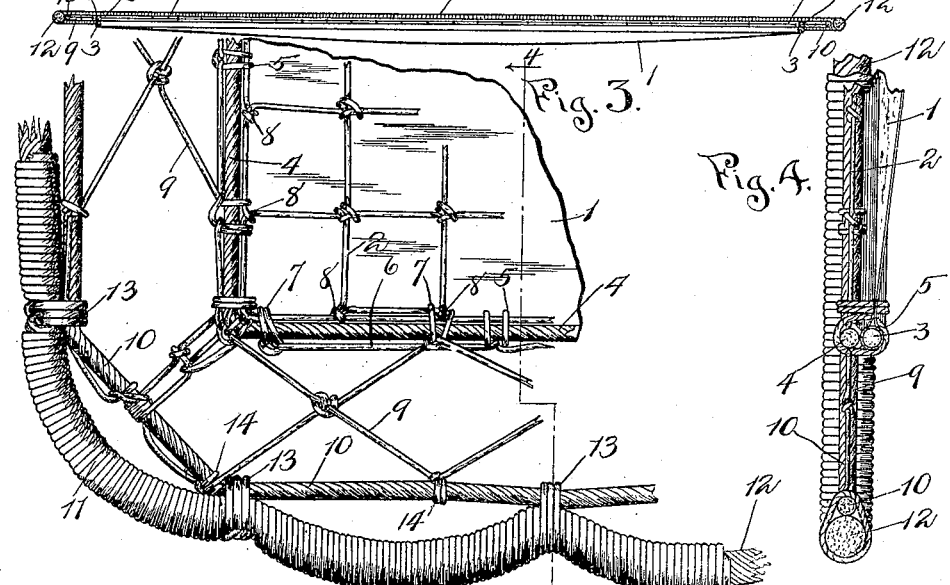
Witnesses.
Ira D. Perry.
S B Skeiv
Jno Dick, Inventor.
By Elliott & Hopkins, Attys.

UNITED STATES PATENT OFFICE.

JOHN DICK, OF CHICAGO, ILLINOIS.

LIFE-SAVING NET.

SPECIFICATION forming part of Letters Patent No. 641,278, dated January 16, 1900.

Application filed May 11, 1899. Serial No. 716,360. (Model.)

*To all whom it may concern:*

Be it known that I, JOHN DICK, a citizen of the United States, residing at Chicago, in the county of Cook and State of Illinois, have invented certain new and useful Improvements in Life-Saving Nets, of which the following is a full, clear, and exact specification.

My invention relates to that class of life-saving nets usually employed for catching persons jumping or falling from buildings in time of fire, the net being held on the ground at the edges by the firemen.

My invention has for its primary object to provide a life-saving net of this character which shall be so constructed at the edges as to afford a perfect grip or hold for the hands of the persons holding the net, so that all danger of injury to the hands of such persons either by direct contact with the falling body or by the sudden jerk on the net will be absolutely avoided, and the net itself will be of such a character that the falling body will be first resisted by a part thereof of a more yielding character than the balance and will be finally checked in its downward course by a stouter portion.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

In the said drawings, Figure 1 is a plan view of my improved life-saving net. Fig. 2 is a transverse sectional view thereof, taken on the line 2 2, Fig. 1. Fig. 3 is an enlarged plan view of one corner; and Fig. 4 is a sectional view on the line 4 4, Fig. 3.

1 represents a piece of canvas or other stout fabric, which may be square or any other suitable shape, but preferably square, and 2 is a net arranged immediately over the canvas 1 and secured at its edges to the edges of the latter, the two being substantially the same in size. The canvas 1 is surrounded at the edges by a cord or rope 3, around which the edge of the canvas may be secured, as better shown in Fig. 4, and this cord or rope 3 is secured or lashed at short intervals to another cord or rope 4, extending around the sides of the net 2 immediately over the rope 3, by means of knots or loops 5, preferably formed by passing a continuous rope or cord 6 along the cord 4 and tying it at short intervals around the two cords 3 4. The edge of the net 2 is secured at short intervals to the cord or rope 4 by knots or loops 7, which pass around the two cords 3 4, and each knot 7 preferably straddles one of the knots 8 in the margin of the net, so that the net will be prevented from slipping longitudinally of the cord 4.

The canvas 1 is somewhat larger than the net 2, so that when strained and applied to the edges of the net 2 the net will be drawn taut and the canvas will be more or less slack, drooping slightly below the net, as indicated in Figs. 2 and 4, so that a body falling into the net will first encounter the yielding net 2, and the fall will be more or less checked before encountering the less yielding member or canvas 1.

The knots 7, which secure the net 2 to the cord 4, are preferably constituted by the cord which forms a connecting web or net 9, which connects the cord 4 to another surrounding cord 10, arranged at considerable distance from the edges of the canvas 1 and net 2 and being attached to a surrounding handhold or grip-rope 11, by means of which the device is firmly held in position to receive the falling body. This grip-rope 11 is shown as composed of an inner core 12, wrapped with a cord which is carried around the cord 10 at short intervals throughout its length, as shown at 13, so as to bind the cord 10 to the grip-rope. The loops 13 thus constituted hold the two parts together with capability of slight longitudinal movement of the cord or rope 10, so that the weight falling into the net will be distributed with more or less uniformity to the hands of the various persons holding the device. The loops 13, however, are arranged between the knots 14, which connect the net or web 9 to the cord 10, so that the longitudinal movement of the latter will be limited. It will also be seen that the cord 10 and grip-rope 11 being connected together in this manner appropriate grips are formed throughout the length of the rope 11 for the hands of those holding the device, and the fingers being thus permitted to pass entirely around the rope 11 all danger of injury to the ends of the fingers and danger of the net being jerked out of the hands by the falling body will be avoided. It will also be seen that the grip-rope being located a considerable distance from that part of the net into which the body falls danger of direct contact with the falling body is reduced to the minimum.

Having thus described my invention, what I claim as new therein, and desire to secure by Letters Patent, is—

1. In a life-saving net the combination of a marginal or grip rope, a second rope extending around the inner side of said grip-rope and being attached thereto at intervals, a double fabric for receiving the falling body arranged within said inner rope and a web connecting said double fabric and inner rope together, substantially as set forth.

2. In a life-saving net the combination of a surrounding grip-rope, a second rope extending around the inner side of said grip-rope and being attached thereto at intervals only so as to form grip-loops and a net or fabric attached at its edges to said inner rope, substantially as set forth.

3. In a life-saving net the combination of a surrounding grip-rope, a second rope surrounding the inner side of said grip-rope, said grip-rope being formed with loops constituting part thereof passing around said second rope at short intervals and a net or fabric arranged within and attached at its edges to said second rope, substantially as set forth.

4. In a life-saving net the combination of a surrounding grip-rope, a second rope to which said grip-rope is attached at intervals, a third rope arranged at the inner side of said second rope, a net arranged within and secured to said third rope and a web or net connecting said second and third ropes together, substantially as set forth.

5. In a life-saving net the combination of a surrounding grip-rope, a second rope secured to said grip-rope at short intervals, a third rope arranged at the inner side of said second rope and being connected thereto but at a distance therefrom, a net supported by said third rope, a fourth rope surrounding the under side of said third rope and being attached thereto and a canvas of larger area than said net and arranged thereunder and connected to said fourth rope, substantially as set forth.

6. In a life-saving net the combination of a surrounding grip-rope, a net having the knots 8 at its edges, the rope 4 surrounding said net, a canvas arranged under said net and having the marginal rope 3 attached to the rope 4 and the net 9 secured to the grip-rope and having the knots 5 straddling the knots 8 and surrounding the marginal cord of the first said net and the rope 4, substantially as set forth.

JOHN DICK.

Witnesses:
 EDNA B. JOHNSON,
 F. A. HOPKINS.